United States Patent [19]
Ely et al.

[11] Patent Number: 6,002,758
[45] Date of Patent: *Dec. 14, 1999

[54] SYSTEM AND METHOD FOR DEVELOPING MESSAGE PROCESSING APPLICATIONS

[75] Inventors: Thomas Chambers Ely, Bridgewater; George White Hartley, Somerville; Rohini Vijay Marathe, Holmdel; Richard Allan Orriss, Colts Neck; Subramanya Kolpe Shastry, Middletown, all of N.J.

[73] Assignee: Telcordia Technologies, Inc., Morristown, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 08/631,387

[22] Filed: Apr. 12, 1996

[51] Int. Cl.$^6$ .............................. H04M 3/42; G06F 13/00; G06F 3/00

[52] U.S. Cl. .......................... 379/207; 379/201; 707/507; 395/821

[58] Field of Search ...................................... 379/207, 220, 379/201, 253, 289; 707/507, 508; 395/705, 200.36, 200.37, 680, 683, 821

[56] References Cited

U.S. PATENT DOCUMENTS

| | | | |
|---|---|---|---|
| 5,377,186 | 12/1994 | Wegner et al. | 379/201 |
| 5,519,772 | 5/1996 | Akman et al. | 379/211 |
| 5,694,463 | 12/1997 | Christie et al. | 379/207 |
| 5,696,809 | 12/1997 | Voit | 379/265 |

Primary Examiner—Krista Zele
Assistant Examiner—Benny Q. Tieu
Attorney, Agent, or Firm—Joseph Giordano

[57] ABSTRACT

An input message processor translates interface-specific input messages into a core and extended format. A message interpreter includes a core and extended set of instructions associated with a multi services application protocol for interpreting call processing records in response to input messages in the core and extended format. An output message processor receives output messages from the interpreter and uses interface-specific output message definitions to process the output messages into interface-specific output messages.

5 Claims, 3 Drawing Sheets

SYSTEM AND METHOD FOR DEVELOPING MESSAGE PROCESSING APPLICATIONS

CROSS REFERENCES TO RELATED APPLICATIONS

This application is related to U.S. patent application Ser. No. 08/168,612 entitled A Network-Based Telephone System Having Interactive Capabilities, filed Jan. 31, 1995, now pending; U.S. patent application Ser. No. 07/934,240, entitled "System and Method for Creating, Transferring, and Monitoring Services in a Telecommunication System," filed Aug. 25, 1992, by Zaher A. Nazif et al., now abandoned; U.S. patent application Ser. No. 07/972,529, entitled "System and Method for Creating, Transferring, and Monitoring Services in a Telecommunication System," filed Feb. 6, 1992, by Zaher A. Nazif et al., now abandoned; and U.S. patent application Ser. No. 07/972,817, entitled "A Method of Creating a Telecommunication Service Specification," filed Nov. 6, 1992, by Susan K. Man et al., now U.S. Pat. No. 5,450,480. The contents of these applications and patents are incorporated by reference.

A portion of the disclosure of this patent document contains material which is subject to copyright protection. The copyright owner has no objection to facsimile reproduction by anyone of the patent document, as it appears in the Patent and Trademark Office patent file or records, but otherwise reserves all copyright rights whatsoever.

BACKGROUND OF THE INVENTION

The present invention relates generally to a message processing system and method and more particularly to a rapid development method and system for a message processing application.

Today, communication network elements communicate according to predetermined application interfaces. For example, today's Advanced Intelligent telephone Network ("AIN") has network elements which support several applications including an AIN Release 0 service control point ("SCP") application and an AIN Release 0.1 SCP application. As new interfaces are added to the telephone network, so are service-related applications. Interfaces comprise a set of messages which must be processed by the service related applications. This specification also refers to the interfaces as message sets. For example, personal communication services ("PCS") and customer contact services ("CCS") in the AIN are new applications which have been designed and supported using IS41 and 1129+ message sets. To do so, however, telephone network elements, such as SCPs, must be upgraded to support IS41 and 1129+ message sets in addition to AIN Release 0 and/or AIN Release 0.1 message sets. Network elements may also support generic interfaces such as the Generic Data Interface ("GDI") message set. Moreover, as new applications are created, new message sets must also be supported.

Today's AIN Release 0 and other telephone network applications are supported by a Multi Services Application Protocol ("MSAP") and SPACE-based call processing records ("CPR") for each user. As explained in the related patent applications, in the AIN, telephone switches respond to calls from a caller by sending triggers requesting call processing information to a SCP running MSAP and SPACE-based CPRs. MSAP executes the SPACE-based CPRs corresponding to certain trigger information to provide call processing instructions back to the switch.

Each time a new interface, such as a new cellular network interface, is added to the telephone network, MSAP must be extended to support that new interface. This has several drawbacks. In particular, since MSAP is a huge application, hundreds of thousands of lines of code must be reevaluated, rewritten, developed, tested, and compiled, before being set up in the network. Developers must not only test the new code, but must test the old code, as well, to ensure that the old capability continues to exist and the new capability works as required. Moreover, since the MSAP platform is distributed across many SCPs in the network, to deploy the rewritten MSAP, software fixes must be applied at each SCP site, all of which takes a great deal of time.

Thus, in today's telephone network, the design, development, testing, deployment, and maintenance of new interfaces are time-consuming and expensive. The same holds true for expanding interfaces in other domains, such as operations systems and network engineering systems.

It is therefore desirable to provide a message processing system that substantially obviates one or more of the problems due to limitations and disadvantages of the related art.

It is also desirable to provide a message processing system that can be rapidly designed, developed, tested, deployed, and maintained.

It is further desirable to provide a flexible message processing system and method which can be efficiently and rapidly expanded to support new applications and interfaces.

Additional objectives, features, and advantages of the invention will be set forth in the description which follows, and in part will be apparent from the description, or may be learned by practice of the invention. The objectives and other advantages of the invention will be realized and attained by means of the instrumentalities and combinations particularly pointed out in the written description and appended claims hereof, as well as the appended drawings.

SUMMARY OF THE INVENTION

To achieve these and other advantages and in accordance with the purposes of the invention, as embodied and broadly described, the invention is directed to a message processing system, comprising one or more sets of first input message definitions and an input message processor, responsive to first format input messages and corresponding ones of the one or more sets of first format input message definitions, for processing the first format input messages into second format input messages. A message interpreter is responsive to second format input messages and executes a predetermined one of the one or more call processing records and generates an output message. One or more sets of interface-specific output message definitions are used by an output message processor that is responsive to the output messages and corresponding ones of the one or more sets of interface-specific output message definitions for processing the output messages into interface-specific output messages.

In another aspect of the invention, a method of processing messages in a system running one or more interfaces includes the steps of translating first format input messages into second format input messages using a set of input message definitions corresponding to interfaces identified in the first format input messages, executing call processing records in response to the second format input messages and generating output messages, and translating the output messages into interface-specific output messages using a set of output message definitions.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are incorporated in and constitute a part of the specification, illustrate presently preferred implementations of the invention and, together with the general description and the detailed description of the preferred implementations given below, serve to explain the principles of the invention.

In the Drawings.

BEST MODE FOR CARRYING OUT THE INVENTION

Reference will now be made in detail to the construction and operation of preferred implementations of the present invention which are illustrated in the accompanying drawings.

The present invention includes a message processing system having an input processor responsive to first format input messages and corresponding interface-specific input message definitions for processing a first format input message into a second format input message, a message interpreter responsive to the second format input messages for executing a predetermined call processing record and generating an output message, and an output message processor responsive to the output message and interface-specific output message definitions for processing the output messages into interface-specific output messages.

Figure 1:
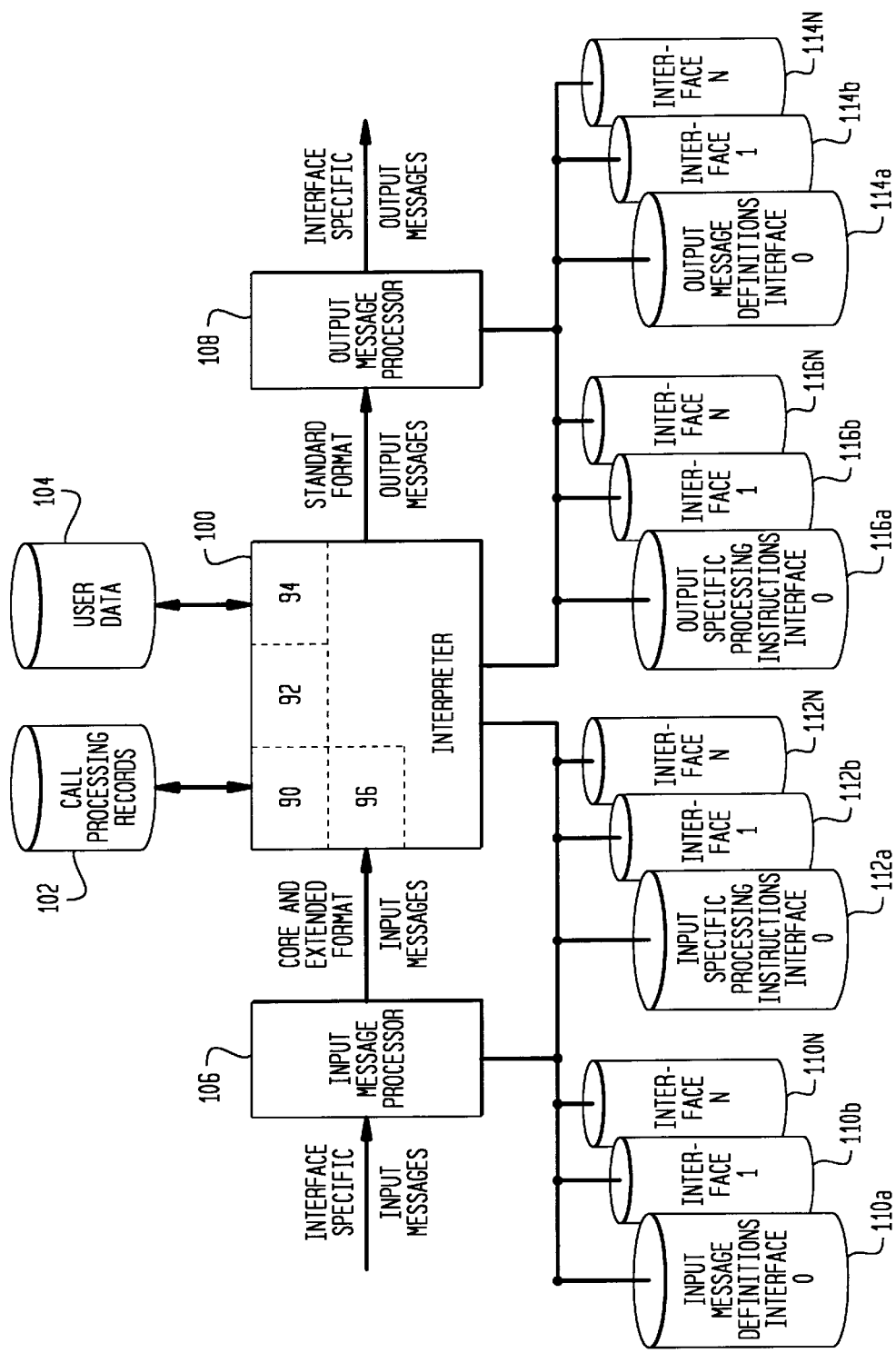
FIG. 1 is a block diagram of a message processing system in accordance with the present invention.

As herein embodied and shown in FIG. 1, a message processing system comprises a plurality of sets of interface-specific input message definitions 110a–110n, each corresponding to a different interface (interface 0 through interface n) and which define how to parse an input message, a plurality of sets of input specific processing instructions 112a–112n, each corresponding to a different interface (interface 0 through interface n), input message processor 106, call processing records 102, an interpreter 100, a plurality of sets of interface-specific output message definitions 114a–114n, each corresponding to a different interface (interface 0 through interface n), a plurality of sets of output specific processing instructions 116a–116n each corresponding to a different interface (interface 0 through interface n), output message processor 108, and user data 104.

When a new message set is added to the set of message sets which MSAP can process, 1) the types of input/output parameters which the interpreter can act upon must be extended; 2) the types of user data must be extended; 3) the set of instructions which the interpreter can execute must be extended and 4) new message parameters must be added, these new parameters being similar to system variables in other applications. The invention provides a system and method for these extensions without rewriting or developing additional MSAP software.

Interpreter 100 includes a subset or core set of MSAP instructions. As previously discussed, MSAP has thousands of lines of code and instructions, therefore the interpreter includes core instructions including assignment instructions 90, decision instructions 92, manipulator instructions 94 and generic action instructions 96. MSAP instructions are well known to those in the software industry.

As new interfaces are developed and encountered, the core set of instructions is extended to add instructions related to the new interface and corresponding message parameters. These instructions are added to the interpreter's set of instructions through the datafiles at 110a–110n, 112a–112n, 114a–114n, 116a–116n.

The interpreter 100 receives an input message in core and extended format from the input message processor 106. A core format is a data format that the interpreter 100 can read and includes the necessary core instructions, such as assignment or decision instructions, which comprise the core set of MSAP instructions. A core and extended format is the same as the core format, however, the core and extended format may refer to instructions in the core set as well as instructions in the extended set of instructions.

To permit interpreter 100 to process core and extended message set specific language, the present invention includes input message processor 106 to translate interface-specific input messages, at times referred to as the first format, into core and extended format, at times referred to as the second format, and further includes output message processor 108 to translate core and extended format output messages into interface-specific output messages. In a preferred embodiment, input message processor 106 and output message processor 108 are software interfaces.

The input message processor 106, interpreter 100, and output message processor 108, are a part of a single software unit. The instructions and definitions stored in datafiles 110a–110n, 112a–112n, 114a–114n, and 116a–116n, are external to the software unit. When new interfaces are encountered which require different instructions than those in the core set of instructions, new instructions and message parameters are added to the core set of instructions through the datafiles 110a–110n, 112a–112n, 114a–114n, and 116a–116n. These datafiles are "read" by the single software unit at software startup.

To provide an input message translation, the message processing system of the present invention includes a set of interface-specific input message definitions for each interface 110a–110n supported by the system. FIG. 1 illustrates these interfaces generically as interface 0, interface 1, and interface n. In a preferred embodiment, these interfaces may correspond to telephone network applications AIN Release 0, AIN Release 0.1, IS41, GDI, 1129+, CORE INAP, GSM, and other new telephone and/or broadband message processing applications. Input message processor 106 parses an input message by referring to the interface-specific input message definitions 110a–110n such as those shown in Appendix B which is part of this specification and consists of pages B1 through B10.

The interpreter 100 uses extended instructions, such as those shown in Appendix C, which is part of this specification and consists of pages C1 through C4, to interpret the CPR and provide output message parameters to the output message processor as shown in Appendix A, which is part of this specification and consists of pages A1 through A4.

Similarly, to provide the output translation from core and extended format output messages to interface-specific output messages, the message processing system includes one or more sets of output message definitions 114a–114n. Again, FIG. 1 illustrates these interfaces generically as interface 0, interface 1, and interface n. Output message processor 108 forms an output message based on the output message definitions 114a–114n. In a preferred embodiment, the output message definitions correspond to the same interfaces as the input message definitions, but may also be used to translate from one format to another. Thus, for each interface supported by a message processing system according to the present invention, the message processing system includes one or more input message definition sets and one or more output definition sets. Exemplary descriptions of an input and output message definition sets are shown in Appendix B.

Interpreter 100 processes CPRs by interpreting CPRs for a message set regardless of which interface messages are received. Call processing records 102 may comprise one or more call processing records CPRs, and user data 104 may comprise a call screening list. Thus, for example, interpreter 100 may respond to an interface-specific input message from a telephone switch requesting call processing information by executing a CPR corresponding to information specified in the input message and providing instructions to the telephone switch in an output message to the switch. A CPR is a set of instructions provided by a service creator which specify how the interpreter 100 is supposed to process the input message. The set of instructions given in a CPR act on parameters in an input message and format parameters for outgoing messages. In addition the set of instructions act on user data.

Figure 2:
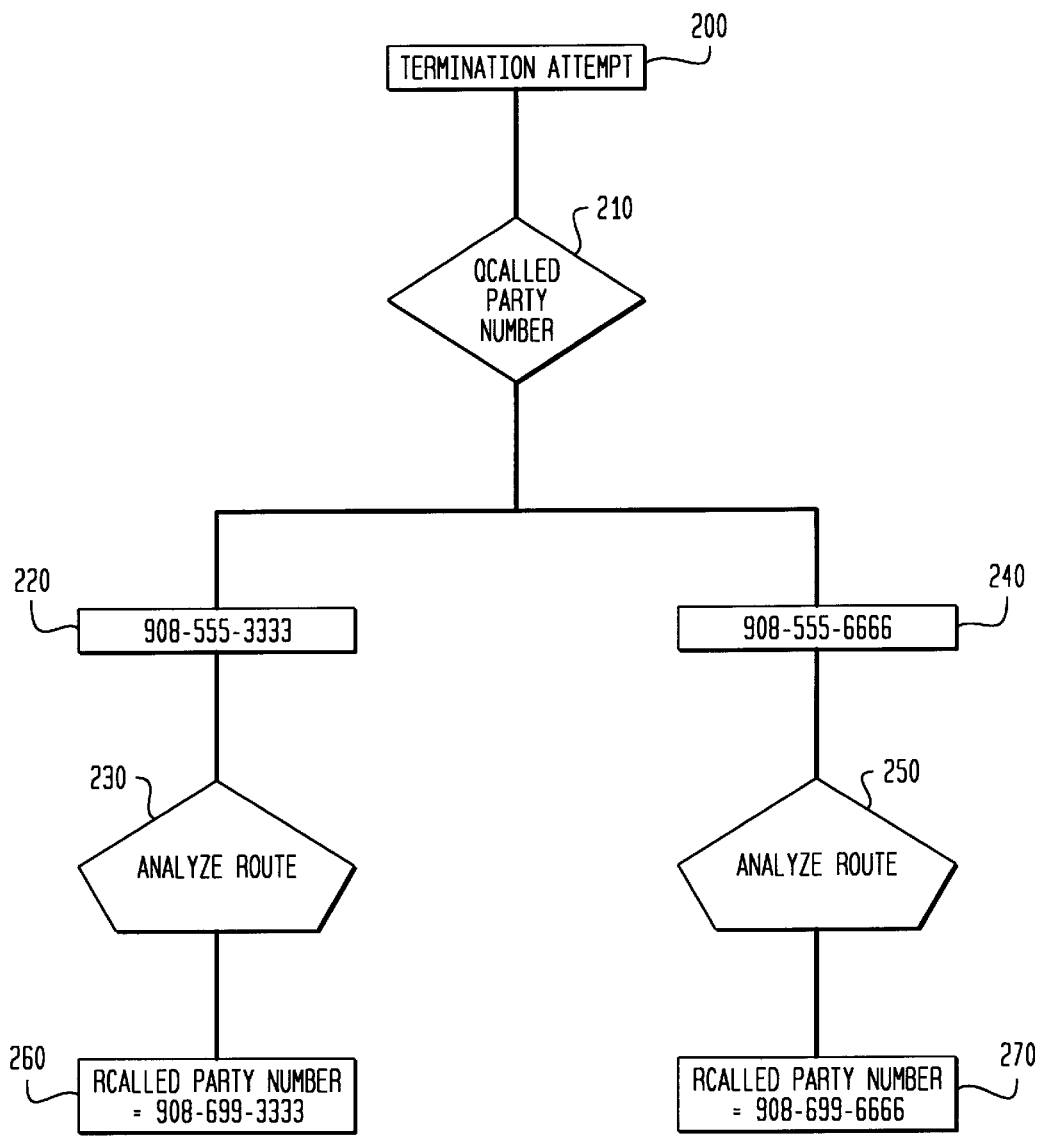
FIG. 2 is an example CPR.

FIG. 2 shows an example CPR for the AIN Release 0.1 message set to interpret. In this example the following elements were added to the instructions which the interpreter 100 understands:

1. A new trigger—Termination Attempt (200),
2. A new incoming parameter—QCALLED PARTY NUMBER (210), has associated phone numbers 220 and 240,
3. A new instruction to send out a new message to the switch—Analyze Route (230, 250), and
4. A new outgoing parameter—RCALLED PARTY NUMBER (260, 270).

The addition of these elements to the interpreters language is known as extending the language for AIN Release 0.1. Prior to the invention these extensions to the interpreter were implemented by modifying MSAP software. The invention allows for such extensions to be added through definitions 110a–110n, 112a–112n, 114a–114n, 116a–116n.

Figure 3:
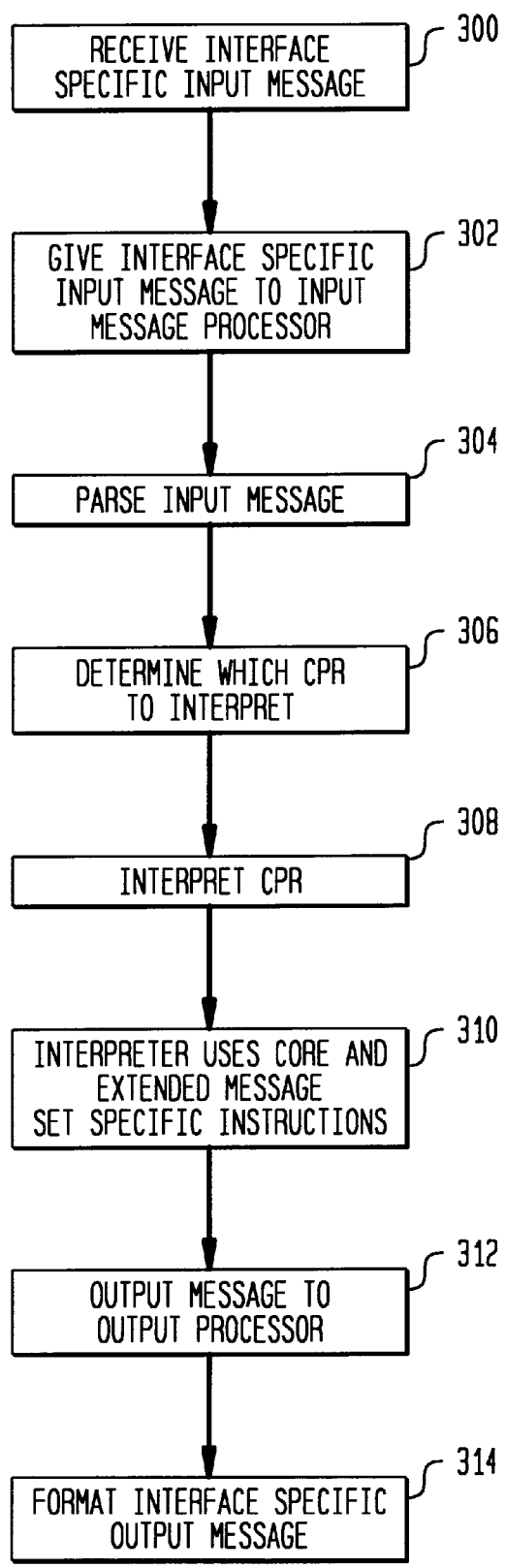
FIG. 3 is a flow diagram illustrating the processing of a message in accordance with the present invention.

FIG. 3 provides a processing flow diagram illustrating the operation of the message processing system of FIG. 1. Initially, the message processing system receives an interface-specific input message (step 300). The message processing system feeds the interface-specific input message to the input message processor 106 (step 302). Each new interface requires specialized routines stored as input specific processing instructions in 112a–112n for use by the input message processor 106. The analysis performed by the input message processor 106 is known as service key analysis.

The input message processor 106 parses (step 304) the incoming messages and determines which CPR to interpret based on an identifier in the input message (step 306). The method for parsing the input message is provided in interface-specific input message definitions 110a–110n.

After receiving the parsed input message and the CPR identifier, the interpreter 100 uses extended message set specific instructions to process the CPR (step 310) resulting in an output message (step 312) sent to the output processor 108. Output processor 108 formats the output variables in accordance with output processing definitions 114a–114n (step 314).

In the example, shown in FIG. 2, the specialized routine for AIN Release 0.1 would determine the CPR to interpret and determine that the Termination Attempt trigger within that CPR was to be interpreted. The input message processor 106 places the called Party Number received from the switch into a core and extended format variable called QCALLED PARTY NUMBER. The example CPR acts on this core and extended format variable. Accordingly, in a preferred embodiment of the present invention, the message processing system includes one or more sets of input specific processing instructions 112a–112n and corresponding sets of output specific processing instructions 116a–116n.

After translating an interface-specific input message to a core and extended format input message, the input message processor 106 passes the core and extended format input message to the interpreter 100. As explained above, the interpreter 100 responds to the core and extended format input message by executing a corresponding call processing record 102. If when processing the call processing record 102, user data is needed, interpreter 100 obtains the user data from user database 104. For the example, shown in FIG. 2, the user data is embedded within the CPR in the Analyze Route Node, specifically 908-699-3333 or 908-699-6666. Again, interpreter 100 provides a processing instruction in a core and extended format output message and passes the core and extended format output message to an output message processor 108 (step 314).

The output message processor 108 receives instructions from the specialized routine Analyze Route and formats the outgoing message. The definition of how to format the outgoing message is given in the output message definition interfaces 114a–114n. In the example shown in FIG. 2, the instruction or node Analyze Route was added to the interpreter's language set. A specialized routine is added in the output specific processing information interfaces 116a–116n to process the Analyze Route instruction. The output message processor 108 then outputs an interface-specific output message.

While there has been illustrated and described what are at present considered to be a preferred embodiment and method of the present invention, it will be understood by those skilled in the art that various changes and modifications may be made, and equivalents may be substituted for elements thereof without departing from the true scope of the invention. The current definitions for parsing incoming messages or building outgoing messages are for the abstract syntax notation (ASN.1) protocol. Other protocols may be used in conjunction with the invention without departing from the true scope of the invention. The current invention processes network messages, however, incoming data from files may be substituted for network messages. This is particularly useful in operations systems software.

In addition, modifications may be made to adapt a particular element, technique, or implementation to the teachings of the present invention without departing from the central scope of the invention. Therefore, it is intended that this invention not be limited to the particular embodiment and method disclosed herein, but that the invention include all embodiments falling within the scope of the appended claims.

What is claimed is:

1. A message processing communication system that allows the processing of new message sets without modification of the software code and instructions of the system, and comprising:

an interpreter which contains the assignment instructions, decision instructions, manipulator instructions, and generic instructions for the system;

an input message processor responsive to first format input messages for translating said input messages to a format for delivery to said processor;

an output message processor responsive to messages from said interpreter for processing output messages from said interpreter into output format messages; and a plurality of datafiles distinct from said interpreter and to which definitions and instructions for the system can be added, first ones of said datafiles being connected to said input message processor and second ones of said datafiles being connected to said output message processor; and wherein said first ones of said datafiles include input message definition interfaces and input processing instruction interfaces and said second ones of said datafiles include output specific processing instruction interfaces and output message definition interfaces, all for utilization by said input and output message processors in place of instructions contained in said interpreter.

2. The message processing system of claim 1 wherein new interface and corresponding message parameters for new input message sets are added to said first ones of said datafiles and new interface and corresponding message parameters for new output message sets are added to said second ones of said datafiles.

3. A method for processing new message sets in a message processing communication system without modifications of the software code and instructions of the system, said system comprising an interpreter which contains the instructions of the system, an input message processor, an output message processor, and a plurality of datafiles distinct from said interpreter, said method comprising the steps of:

adding to the datafiles instructions related to new interfaces and corresponding message parameters of new message sets; and utilizing the new interface and message parameters in first ones of the datafiles by the input message processor to translate a message of the new message set into a format for delivery to the interpreter and in second ones of the datafiles by the output message processor for translating the message from the interpreter into an output message format; and wherein said first ones of said datafiles contain input message definition interfaces and specific processing instructions and wherein said second ones of said datafiles contain output message definition interfaces and output specific processing instructions.

4. The method of claim 3 wherein said step of adding comprises adding new input message definition interfaces and corresponding message parameters of a new input message set to said first ones of said datafiles.

5. The method of claim 3 wherein said step of adding comprises adding new output message definition interfaces and new output specific processing instructions of a new output message set to said second ones of said datafiles.

* * * * *